May 19, 1970 M. H. FRANKEL 3,512,681
MEASURING DISPENSER
Filed May 10, 1967
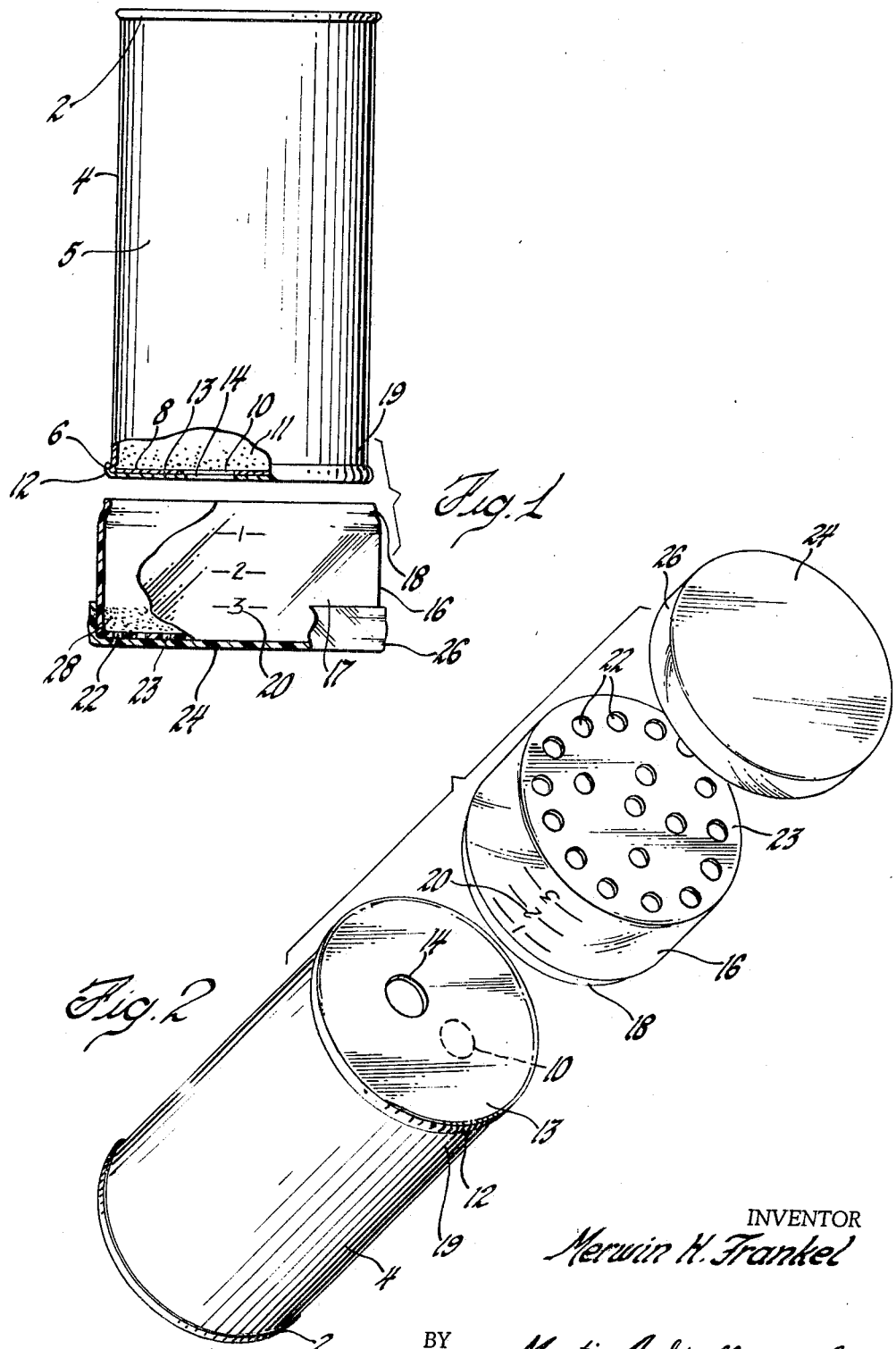
INVENTOR
Merwin H. Frankel
BY
Martin G. Spellman, Jr.
ATTORNEY United States Patent Office 3,512,681
Patented May 19, 1970

3,512,681
MEASURING DISPENSER
Merwin H. Frankel, Scarsdale, N.Y., assignor to Geigy Chemical Corporation, Ardsley, N.Y., a corporation of New York
Filed May 10, 1967, Ser. No. 637,408
Int. Cl. B67d 5/38
U.S. Cl. 222—158                                      1 Claim

ABSTRACT OF THE DISCLOSURE

A measuring dispenser for particulate material which is comprised of a closable cannister, a transparent measuring container with measuring indices, which fits on top of the cannister. The outer end of the container is perforated and is covered with a flexible overcap in the non-dispensing condition.

THE INVENTION

This invention relates to a new and convenient dispenser for particulate materials. The measuring dispenser of this invention is especially useful in dispensing measured amounts of particulate material wherein the amount of material to be used in an end application is relatively critical and the environment of use does not lend itself to the employment of special measuring utensils. For example, the measuring dispenser of this invention is extremely useful for dispensing particulate material such as pesticides, plant stimulants, and other substances for treating plants wherein the amount or strength of material applied is critical.

The measuring dispenser of this invention in general comprises a conventional cannister package containing the particulate material to be dispensed in combination with a transparent measuring container which is provided with apertures for distribution. The transparent container fits on top of the cannister and may be permanently fixed thereto or removably attached. The transparent container also is provided with a removable overcap which covers the apertures.

The measuring dispenser of this invention provides a unit which permits the particulate material to be measured in accurate amounts and conveniently applied.

In addition to the practical utilitarian advantages of the dispenser of this invention, it is also an attractive merchandising device. It presents an eye-pleasing appearance and the space between the top of the cannister and the transparent measuring container may be used to carry and/or display novelty, promotional, premium and/or instructional material.

The measuring dispenser of this invention will be more fully understood by reference to the accompanying drawing and description in which, referring to the drawings:

FIG. 1 is an exploded side view which is partial in section of the measuring dispenser of this invention comprised of a cannister and a measuring container.

FIG. 2 is an exploded perspective view of the cannister, container, and overcap for the container comprising the measuring dispenser of this invention.

Referring more particularly to FIG. 1 it can be seen that the measuring dispenser 2 comprises a cannister 4 having side walls 5 which together with the top 8 are formed into an outwardly extending projection or bead 6 at the juncture of the side wall 5 and the top 8. The top 8 of the cannister 4 is provided with an aperture 10 through which the particulate material 11 in the cannister 4 may pass. In the embodiment shown, the aperture 10 is located eccentrically of the center of the circular top 8. The top 8 is provided with a cover 13 which is rotatably affixed to the cannister 4 by means of the peripheral flange 12 formed in the cover 13 which extends around the projection 6 formed by the side 5 and the top 8. The circular cover 13 is provided with an aperture 14 which, in a manner similar to the aperture 10 in the top 8, is located eccentrically of the center of the cover 13. In FIG. 1, the apertures 10 and 14 are shown in registration with each other. This permits the particulate material 11 to be dispensed from the cannister 4. It is apparent that rotating the cover 13 for a suitable distance will place the apertures 10 and 14 out of registration with each other and effectively close the cannister 4. Any other conventional closure, of course, can be substituted for the cover 13. For example, a stopper can be placed in the aperture 10.

The transparent container 16 which has volume indices 20 on the side wall 17 thereof comprises the means whereby the particulate material is measured. The end closure 23 of the transparent container 16 has multiple perforations 22 therein. The overcap 24 covers these apertures during measuring, storage or any non-dispensing situation. The overcap 24 is made of flexible material and is fabricated in such a manner that the sides 26 thereof frictionally engage the outer surface of the side wall 17 of the container at the end having closure 23.

The ends of the side walls 17 adjacent the cannister end of the container 16 are formed with an inwardly extending portion 18 which in the embodiment shown frictionally engages the peripheral flange 12 of the cover 13. Thus in the preferred embodiment illustrated, the inwardly extending portion 18 is formed in such a manner that the rotation of the container 16 causes the cover 13 of the cannister 4 to rotate by virtue of the frictional engagement.

In the exploded view in FIG. 2, the cover 13 is shown in the closed position with the aperture 10 of the top 8 shown in phantom. In use, the closed dispenser is inverted as illustrated in FIG. 1. In the embodiment shown, the user rotates the container 16 and the cover 13 together to bring the apertures 10 and 14 into registration so a measured amount 28 of the particulate material 11 may be transferred into the container 16. When the desired amount has been measured, the container 16 and cover 13 are rotated so that the apertures 10 and 14 are no longer in registration with each other and the flow of particulate material 11 ceases. Thereafter when it is desired to dispense the measured material 28, the overcap 24 is removed so the measured particulate material 28 can pass through the perforations 22 in the end closure 23.

Alternatively in lieu of the cover 13 the aperture 10 can be closed with a stopper or any equivalent closure means. In such an embodiment, the container 16 is constructed so that it is removable from the cannister 4. The inwardly extending portions 18 of the side wall 17 of the container snap over the bead 6 and frictionally engage the upper portion of the side wall 5 and also press against the periphery and underside of the bead 6.

In operation under these circumstances, the user removes the container 16 from the top of the cannister 4. The closure means for the aperture 10 is removed and the user pours the particulate material 11 up to the desired amount into the container 16 utilizing the volume indices 20. The closure means is then replaced in the aperture 10 and the cannister 4 snapped in position on the inverted container 16. Thereafter the overcap 24 of the container 16 is removed and the measured material 28 dispensed as desired through the perforations 22 of the end closure 23.

While the invention has been explained by detailed description of certain specific embodiments, it is understood that various modifications and substitutions can be made

What is claimed is:
1. A measuring dispenser comprising:
(a) a cylindrical cannister having a side wall, a top with an aperture therein, said aperture being eccentrically located from the center of said top, an outwardly extending projection at the juncture on said side wall and said top, means for closing said aperture in said top, said means for closing said aperture comprising a rotatable circular cover having an aperture therein eccentrically located from the center of said cover, said cover being rotatable so that said aperture in said cover is registrable with the aperture in said top, said cover having a downwardly extending and inwardly projecting peripheral flange in rotatably moveable engagement with the outwardly extending projection at the juncture of said side wall and said top;
(b) a flexible transparent cylindrical measuring container comprising a side wall having volume indices thereon, said wall defining a first end of said container having a perforated closure and a second end of said container, said second end being open, an inwardly necked portion of said side wall adjacent said second end for holding the container in frictional and removeable engagement with the peripheral flange of the cover, in such manner that rotation of the container will cause rotation of the cover when said container is in engagement therewith; and
(c) an overcap removeably attached to said container and covering said perforated closure.

References Cited

UNITED STATES PATENTS

| | | | |
|---|---|---|---|
| 131,810 | 10/1872 | Clark | 222—565 X |
| 2,576,416 | 11/1951 | Randlett | 222—565 X |
| 3,006,506 | 10/1961 | Germano | 222—450 X |
| 3,314,570 | 4/1967 | Murphy | 222—450 X |

ROBERT B. REEVES, Primary Examiner

N. L. STACK, Jr., Assistant Examiner

U.S. Cl. X.R.

222—450